US010859672B2

(12) United States Patent
Liu

(10) Patent No.: US 10,859,672 B2
(45) Date of Patent: Dec. 8, 2020

(54) DIRECTIONAL RADAR TRANSMITTING AND RECEIVING SENSOR BOARD

(71) Applicant: Gardenia Industrial Limited, Kowloon (HK)

(72) Inventor: Xiao Xiong Liu, Zhongshan (CN)

(73) Assignee: GARDENIA INDUSTRIAL LIMITED, Tsimshatsui (HK)

(*) Notice: Subject to any disclaimer, the term of this patent is extended or adjusted under 35 U.S.C. 154(b) by 338 days.

(21) Appl. No.: 16/105,540

(22) Filed: Aug. 20, 2018

(65) Prior Publication Data
US 2019/0079163 A1   Mar. 14, 2019

(30) Foreign Application Priority Data

Sep. 8, 2017   (CN) .................... 2017 2 1150101 U

(51) Int. Cl.
*G01S 7/03*   (2006.01)
*G01S 13/04*   (2006.01)
(Continued)

(52) U.S. Cl.
CPC .............. *G01S 7/032* (2013.01); *G01S 13/04* (2013.01); *H01Q 1/525* (2013.01); *G01S 7/023* (2013.01); *H01Q 1/2283* (2013.01)

(58) Field of Classification Search
CPC .......... G01S 7/032; G01S 13/04; G01S 7/023; H01Q 1/525; H01Q 9/04; H01Q 1/2283
(Continued)

(56) References Cited

U.S. PATENT DOCUMENTS 6,130,640 A * 10/2000 Uematsu ................. G01S 7/032
342/175
7,603,097 B2 * 10/2009 Leblanc .................. G01S 7/032
342/70
(Continued)

FOREIGN PATENT DOCUMENTS

EP    0800093 A1 * 10/1997 ............. G01S 7/032
EP    2196818 A2 *  6/2010 ............. G01S 7/032
(Continued)

OTHER PUBLICATIONS

Espacenet English translation of JP2008141406 (A), Jun. 19, 2008, inventor Nakazuru Kazumi, applicant Kyocera Corp.*

*Primary Examiner* — Bernarr E Gregory
*Assistant Examiner* — Nuzhat Pervin
(74) *Attorney, Agent, or Firm* — Lewis Roca Rothgerber Christie LLP

(57) ABSTRACT

A sensor board for transmitting and receiving directional radar signals including a non-conductive substrate having a plurality of first recesses distributed at intervals along at least one edge of the non-conductive substrate; a microwave oscillator including an RC oscillator circuit and a transistor Q1; an anti-coupling foil; a first filter circuit configured to filter an input power Vcc; a second filter circuit configured to filter an output signal; a receiving antenna; and a transmitting antenna including a first wire laid over the plurality of first recesses along the edge of the non-conductive substrate; and a plurality of first electrically conductive protrusions embedded in the first recesses, the first wire electrically connecting the first electrically conductive protrusions.

13 Claims, 9 Drawing Sheets

(51) Int. Cl.
    *H01Q 1/52*     (2006.01)
    *G01S 7/02*     (2006.01)
    *H01Q 1/22*     (2006.01)

(58) Field of Classification Search
    USPC .......................................................... 342/28
    See application file for complete search history.

(56) References Cited

U.S. PATENT DOCUMENTS

| | | | |
|---|---|---|---|
| 7,639,173 B1 * | 12/2009 | Wang | G01S 7/032 |
| | | | 342/114 |
| 8,604,991 B2 * | 12/2013 | Nagayama | H01Q 21/064 |
| | | | 343/776 |
| 2005/0225481 A1 * | 10/2005 | Bonthron | H01Q 1/3233 |
| | | | 342/175 |
| 2010/0060537 A1 * | 3/2010 | Nagayama | H01Q 1/247 |
| | | | 343/776 |
| 2012/0013499 A1 * | 1/2012 | Hayata | H01P 5/107 |
| | | | 342/112 |

FOREIGN PATENT DOCUMENTS

| | | | | |
|---|---|---|---|---|
| JP | 10341113 A | * | 12/1998 | ............... H04B 1/22 |
| JP | 2008141406 A | * | 6/2008 | ............. H01L 25/00 |
| WO | WO-2005101051 A2 | * | 10/2005 | ........... G01S 13/282 |
| WO | WO-2008120826 A1 | * | 10/2008 | ............. G01S 7/032 |

\* cited by examiner

DIRECTIONAL RADAR TRANSMITTING AND RECEIVING SENSOR BOARD

CROSS-REFERENCE TO RELATED APPLICATION(S)

This application claims priority of Chinese Utility Model Patent Application No. 201721150101.2, filed on Sep. 8, 2017 in the State Intellectual Property Office of the People's Republic of China, the disclosure of which is hereby incorporated by reference in its entirety.

BACKGROUND OF THE INVENTION

Conventional radar transmitting and receiving utilizes non-directional or omnidirectional transmitting. However, conventional radar is susceptible to errors, such as false triggering and false operation, especially when using such conventional radar transmitting and receiving techniques are used to trigger a switch to control electrical appliances. For example, in the context of controlling lights, two adjacent rooms that were both equipped with switches that utilize non-directional or omnidirectional radar transmitting often both light up when someone enters just one of the rooms. This is because when the radar detector in one room senses the person entering the room and triggers the switch to activate the light, the radar detector in the next room would also be triggered falsely, thus activating the light in the next room, causing the room to be illuminated, even though there was no motion in the next room. Additionally, comparative directional radar transmitting and receiving devices are not sufficiently robust when transmitting and receiving signals. Thus, the use of the comparative available switch controls that utilize directional radar transmitting and receiving is limited due to these technical issues.

SUMMARY

Aspects of embodiments of the present invention relate to a directional radar transmitting and receiving sensor board that is robust in transmitting and receiving signals, covering a wide area while avoiding or reducing interference.

In some embodiments, the sensor board for transmitting and receiving directional radar signals may include a non-conductive substrate having a plurality of first recesses distributed at intervals along at least one edge of the non-conductive substrate; a microwave oscillator that include an RC oscillator circuit including a plurality of capacitors connected in parallel between ground and an input power Vcc; and a transistor Q1. In some embodiments, the sensor board further includes an anti-coupling foil arranged on the non-conductive substrate, one end of the anti-coupling foil being connected to the base of the transistor Q1, and the other end of the anti-coupling foil being floating. In some aspects, the sensor board for may also include a first filter circuit configured to filter the input power Vcc; a second filter circuit configured to filter an output signal; a receiving antenna; and a transmitting antenna. In some aspects, the transmitting antenna may include a first wire laid over the plurality of first recesses along the edge of the non-conductive substrate and a plurality of first electrically conductive protrusions embedded in the first recesses, the first wire electrically connecting the first electrically conductive protrusions. In some aspects, the transmitting antenna is connected to the collector of the transistor Q1, the input power Vcc is connected to the base of the transistor Q1 through the first filter circuit, the emitter of the transistor Q1 is connected to a first end of the receiving antenna, the second filter circuit is connected to a second end of the receiving antenna and is configured to output signals. In some aspects, the distance between two adjacent first electrically conductive protrusions is less than or equal to 1.5 mm; the total length of the first wire is greater than 80 mm.

In some embodiments, the sensor board may include a first wire that is laid along the edge of the non-conductive substrate configured to form a framed-shaped closed loop. In some aspects, the non-conductive substrate has a plurality of second recesses, and the receiving antenna may include a second wire laid over the plurality of second recesses, the second recesses being distributed at intervals along the second wire.

In some embodiments, the second recesses are in a central portion of the sensor board, and the first wire forms a frame-shaped a closed loop, and the second wire is surrounded by the first wire.

In some embodiments, the sensor board may include a plurality of second electrically conductive protrusions that are embedded in the second recesses, and the second wire electrically connects a plurality of the second electrically conductive protrusions to form the receiving antenna. In some aspects, the distance between two adjacent second electrically conductive protrusions is less than or equal to 1.5 mm, and the total length of the receiving antenna is greater than 20 mm. In some aspects, the second wire has an S-shape. In some embodiments, the anti-coupling foil has a rectangular shape with a length more than 6.5 mm, a width more than 2.5 mm, and an aspect ratio in the range of 1.5:1 to 3:1.

In some embodiments, the plurality of capacitors of the RC oscillator may include three chip capacitors. In some embodiments of the present invention, the plurality of capacitors of the RC oscillator includes four chip capacitors. In some aspects, the chip capacitors are X7R or X5R 0.5 pF chip capacitors.

In some embodiments, the thickness of the first wire is in the range of 30 μm to 40 μm. And in some aspects, the first filter circuit and the second filter circuit are RC filter circuits.

DETAILED DESCRIPTION

Figure 1:
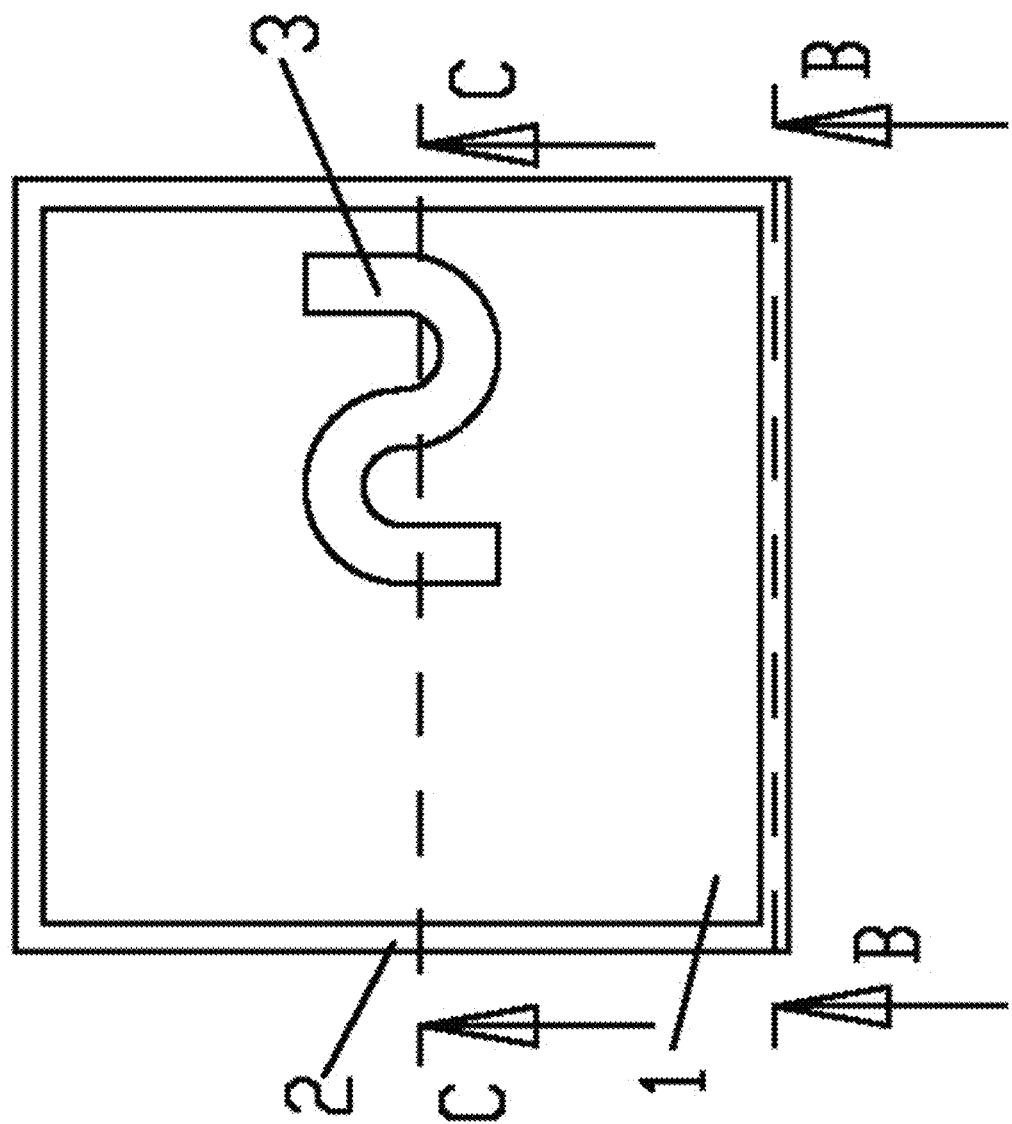
FIG. 1 is a plan view of a radar transmitting and receiving sensor board according to one embodiment of the present invention.
Figure 2:
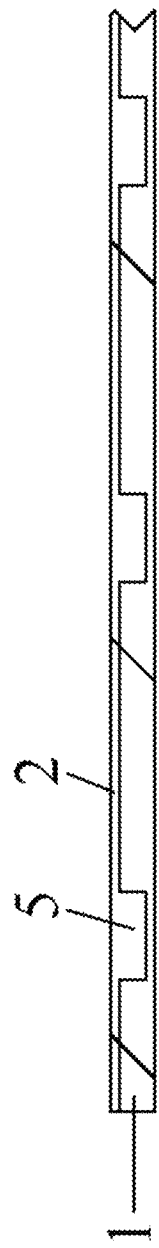
FIG. 2 is a sectional view of the radar transmitting and receiving sensor board of FIG. 1 along the line B-B.
Figure 3:
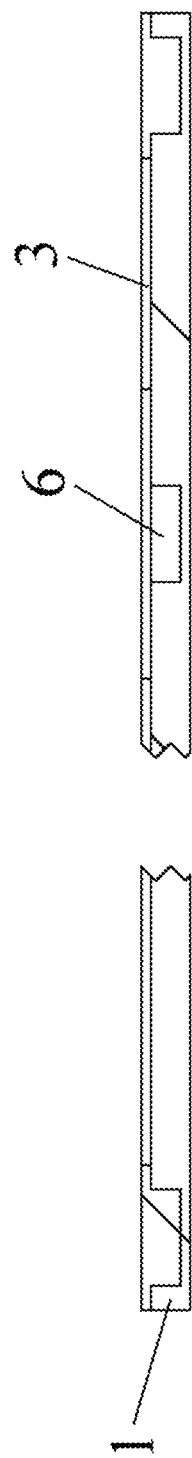
FIG. 3 is a sectional view of the radar transmitting and receiving sensor board of FIG. 1 along the line C-C.
Figure 4:
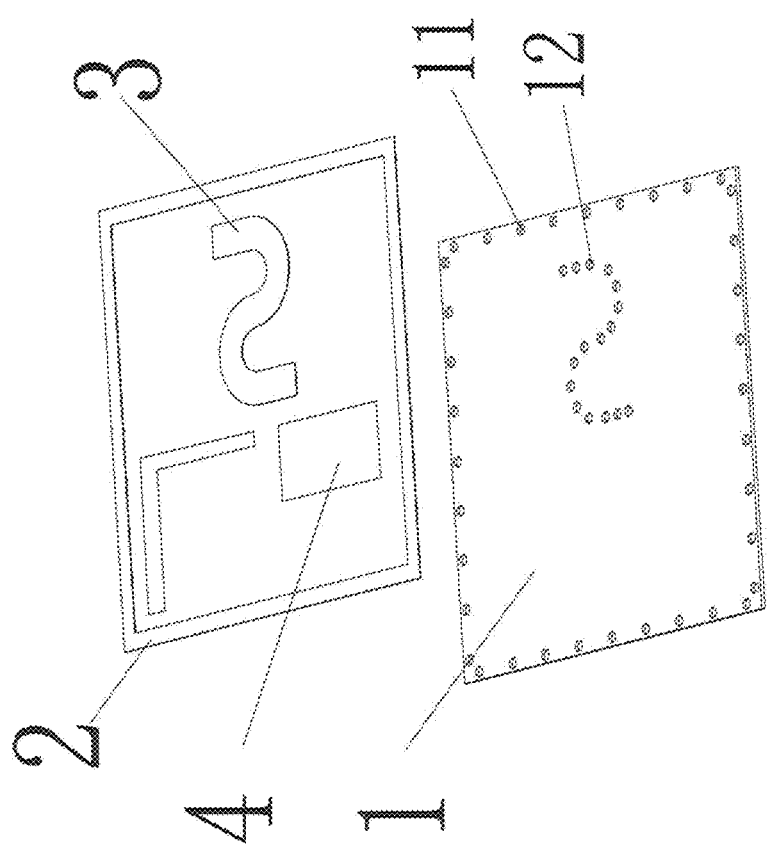
FIG. 4 is an exploded view of a radar transmitting and receiving sensor board according to one embodiment of the present invention.
Figure 5:
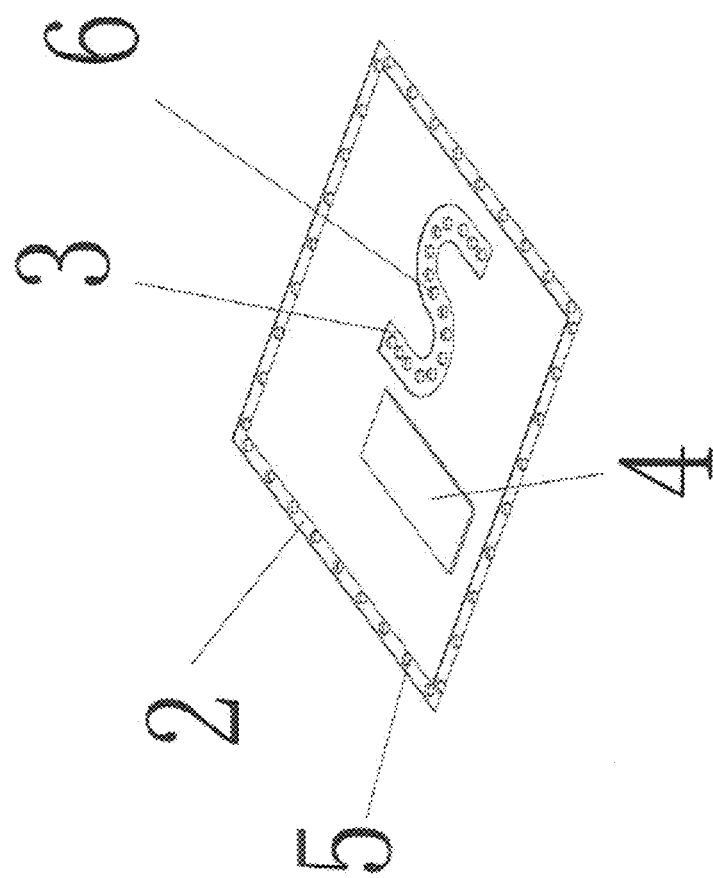
FIG. 5 is a perspective view of the transmitting antenna and receiving antenna portions of a radar transmitting and receiving sensor board according to one embodiment of the present invention.
Figure 6:
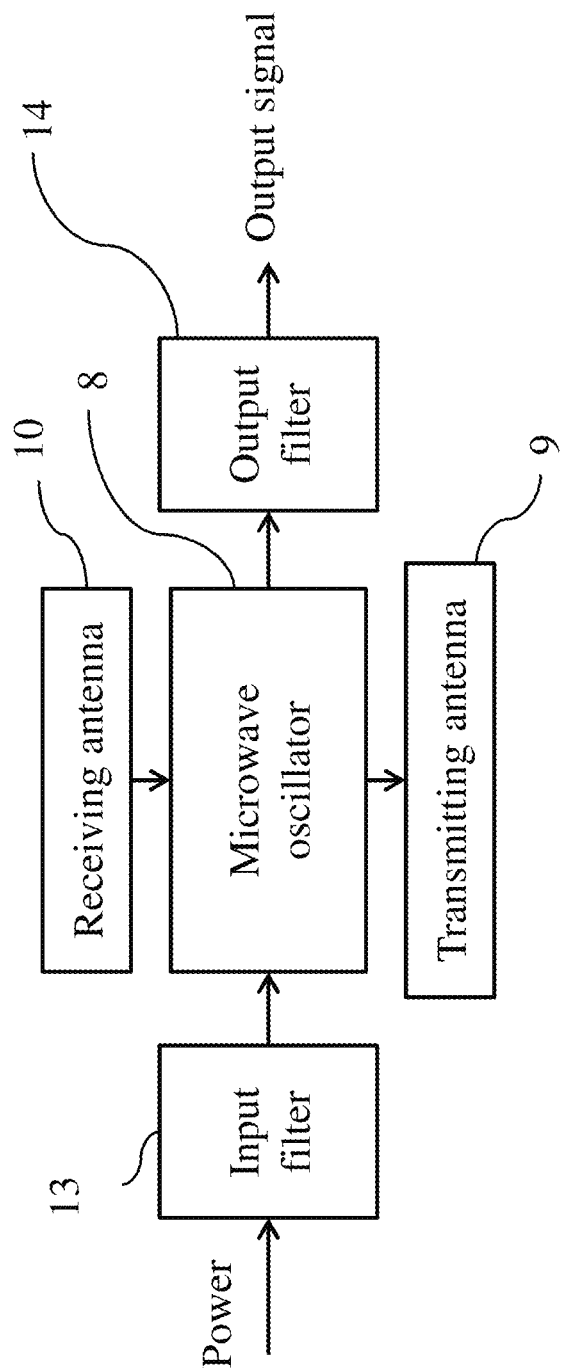
FIG. 6 is a circuit block diagram of the radar transmitting and receiving sensor board according to one embodiment of the present invention.

Aspects of embodiments of the present invention relate to a directional radar transmitting and receiving sensor board that transmits and receives radar signals, reduces or avoids false triggering, and provides stability and adapts to different environments. In some embodiments, the sensor board includes a non-conductive substrate integrated with a microwave oscillator. The microwave oscillator may include a RC oscillator circuit, a transistor, a first filter circuit configured to receive input signals, a second filter circuit configured to receive output signals, and a receiving antenna.

In some embodiments, the RC oscillator circuit may include a plurality of capacitors that are connected in parallel and connected to a transmitting antenna. In some aspects, one end of the capacitors is connected to ground while the other end is connected to the input power and the transmitting antenna. In some embodiments, the transmitting antenna is connected to the transistor at its collector side and the input power is connected to the base of the transistor through the first filter circuit. The emitter of the transistor, however, is connected to one end of the receiving antenna while the other end of the receiving antenna outputs a signal through the second filter circuit.

In some embodiments, a first copper wire is laid along the edge of the non-conductive substrate of the sensor board. The non-conductive substrate of the sensor board is provided with a plurality of first recesses distributed at intervals along the first copper wire (e.g., along the edge of the non-conductive substrate). In some aspects, a plurality of first copper pillars (or first electrically conductive protrusions) is embedded in the first recesses. In some embodiments, the first copper wire electrically connects the plurality of first copper pillars to form a transmitting antenna, the distance between two adjacent first copper pillars is configured to be less than or equal to 1.5 mm, and the total length of first copper wire is configured to be greater than 80 mm.

In some embodiments, the non-conductive substrate may be integrated with an anti-coupling copper foil to further attenuate or eliminate interfering signals. In some aspects, one end of the anti-coupling copper foil is connected to the base of the transistor, and the other end of the anti-coupling copper foil is floating.

In some embodiments, the non-conductive substrate of the sensor board may include a first copper wire that is laid on the edge of the non-conductive substrate to form a frame-shaped closed loop. In some aspects, the non-conductive substrate of the sensor board may include a second copper wire that is arranged in the middle of the first copper wire, which is in the form of a frame-shaped closed loop. The non-conductive substrate of the sensor board may be provided with a plurality of second recesses distributed at intervals along the second copper wire. In some aspects, a plurality of second copper pillars (or second electrically conductive protrusions) are embedded in the second recesses. The second copper wire electrically connects a plurality of second copper pillars to form a receiving antenna. The second copper pillars 6 increase the sensitivity of the receiving antenna 10 (e.g., increase sensitivity over a receiving antenna that contained only the second copper wire, without the second copper pillars 6) in detecting the frequency-shifted signal reflected back from the environment. In some embodiments, the distance between two adjacent second copper pillars is within 1.5 mm and the total length of the receiving antenna is greater than 20 mm.

In some embodiments, the second copper wire is in an S shape. In some embodiments, the anti-coupling copper foil is rectangular, with a length of more than 6.5 mm, a width of more than 2.5 mm, and an aspect ratio in a range of 1.5:1 to 3:1. In some embodiments, the RC oscillator circuit may include three chip capacitors (e.g., ceramic chip capacitors). In some embodiments, the RC oscillator circuit includes only three capacitors (e.g., exactly three capacitors connected in parallel). In some embodiments, the RC oscillator circuit includes four capacitors (e.g., four capacitors connected in parallel). In some aspects, the chip capacitors may be X7R or X5R 0.5 pF chip capacitors. In some embodiments, the first copper wire and the second copper wire may be formed by a copper foil with a thickness in the range of 30 µm to 40 µm, and a weight in the range of 0.5 oz to 1.5 oz. In some embodiments, a RC filter circuit is adopted for the first filter circuit and the second filter circuit.

In some embodiments, the RC oscillator circuit of the microwave oscillator may include multiple capacitors and a transmitting antenna. In some aspects, the capacitors are connected in parallel, with one end connected to the ground, and the other end is connected to the input power Vcc and the transmitting antenna. In some aspects, the transmitting antenna is connected to the collector of the transistor Q1. In some aspects, the RC oscillator may include a non-conductive substrate that is integrated with an anti-coupling copper foil. In some aspects, one end of the anti-coupling copper foil is connected to the base of the transistor Q1 and the other end of the anti-coupling copper foil is floating. In some aspects, a first copper wire is laid along (e.g. adjacent) the edge or edges of the non-conductive substrate of the sensor board. In some aspects, the non-conductive substrate is provided with a plurality of first recesses distributed at intervals along the first copper wire. In some aspects, plurality of first copper pillars are embedded in the plurality of the first recesses, and the first copper wire electrically connects the plurality of first copper pillars to form a transmitting antenna. In some aspects, the distance between two adjacent first copper pillars is less than or equal to 1.5 mm, and the total length of the first copper wire is greater than 80 mm.

In some embodiments, a first copper wire is laid on or along or adjacent the edge of the non-conductive substrate of the sensor board and the first copper wire is configured in a frame-shaped closed loop. In some aspects, a second copper wire is arranged in the middle of the first copper wire that is configured in a frame-shaped closed loop. In some aspects, the non-conductive substrate of the sensor board is provided with plurality of second recesses distributed at intervals along the second copper wire. In some aspects, plurality of second copper pillars are embedded in the plurality of the second recesses where the second copper wire electrically connects a plurality of second copper pillars to form a receiving antenna. In some aspects, the distance between two adjacent second copper pillars is less than or equal to 1.5 mm, and the total length of the receiving antenna is greater than 20 mm. In some aspects, the second copper wire is configured in S-shape.

In some embodiments, the anti-coupling copper foil is shaped as a rectangle, with a length more than 6.5 mm, a width more than 2.5 mm, and an aspect ratio of 1.5:1 to 3:1. In some aspects, the RC oscillator circuit includes a capacitor C1, a capacitor C2, a capacitor C3 and a capacitor C4. In some aspects capacitor C2 is an no-connect capacitor and capacitors C1, C3 and C4 are chip capacitors (e.g. ceramic chip capacitors). In some aspects, capacitors C1, C3 and C4 are X7R or X5R 0.5 pF chip capacitors.

In some embodiments, the copper foil of the first copper wire and the second copper wire has a thickness that is within the range of about 30 µm to about 40 µm (equivalently a weight within the range of about 0.5 oz to about 1.5 oz).

Aspects of embodiments of the present invention relate to a directional radar transmitting and receiving sensor board. Aspects of the present invention will be described in more detail using the following examples, which may describe more than one relevant embodiment falling within the scope of the present invention.

In one embodiment, as shown in FIGS. 1, 2, 3, 4, 5, 6, 7 and 8, the directional radar transmitting and receiving sensor board includes a non-conductive substrate 1 integrated with a microwave oscillator 8. The microwave oscillator may include a RC oscillator circuit, a transistor Q1, a first filter circuit 13 configured to receive input power Vcc (input filter circuit), a second filter circuit 14 configured to receive a signal and to generate a filtered output signal (an output filter circuit), and a receiving antenna 10. According to one embodiment shown in FIG. 7, the RC oscillator circuit may include multiple capacitors and a transmitting antenna 9. In some aspects, the capacitors may be connected in parallel, with one end connected to the ground, and with the other end connected to the input power Vcc and the transmitting antenna 9. In some aspects, the transmitting antenna 9 may be connected to the collector of the transistor Q1; the input power Vcc is connected to the base of the transistor Q1 through the first filter circuit 13, the emitter of the transistor Q1 is connected to the first end of the receiving antenna, and the second end of the receiving antenna outputs a signal through the output filter circuit. In some aspects, the first copper wire may be laid along (e.g., adjacent) the edge or edges of the non-conductive substrate 1 (the first copper wire 2 may have a length corresponding to its dimension in a direction parallel to the adjacent edge of the non-conductive substrate). The non-conductive substrate 1 may be provided with a plurality of the first recesses 11 distributed at intervals along the first copper wire 2. The first plurality of copper pillars 5 may be embedded in the first recesses 11, and the first copper wire 2 electrically connects the plurality of first copper pillars 5 to form a transmitting antenna 9. According to some embodiments, the distance between two adjacent first copper pillars 5 is less than or equal to 1.5 mm, and a total length of the copper wire 2 is greater than 80 mm. In some aspects, the non-conductive substrate 1 may be integrated with an anti-coupling copper foil 4, where one end of the anti-coupling copper foil 4 connects to the base of the transistor Q1 and the other end of the anti-coupling copper foil 4 is floating.

In some embodiments, the first copper wire 2 may be laid along (e.g., on or adjacent) the edge of the non-conductive substrate 1 (e.g., along one edge, along two adjacent edges, along three edges, or along four edges of the non-conductive substrate), and, in some embodiments, the first copper wire 2 may be configured in a frame-shaped closed loop. In some aspects, the second copper wire 3 may be arranged in the middle of the first copper wire 2 which is in a frame-shaped closed loop. In some embodiments, the non-conductive substrate 1 may be provided with a plurality of second recesses 12 distributed at intervals along the second copper wire 3 (e.g., along a path in the non-conductive substrate 1 having the same shape as the second copper wire 3). In some aspects, plurality of second copper pillars 6 are embedded in the second recesses 12 where the second copper wire 3 electrically connects a plurality of second copper pillars 6 to form a receiving antenna 10. In some embodiments, the distance between two adjacent second copper pillars 6 may be less than or equal to 1.5 mm and the total length of the receiving antenna may be greater than 20 mm. In some aspects, the second copper wire 3 is in an S-shape.

In some aspects, the anti-coupling copper foil 4 is shaped as a rectangle, with a length more than 6.5 mm, a width more than 2.5 mm, and an aspect ratio of 1.5:1 to 3:1.

In some embodiments, a number of capacitors in the RC oscillator circuit may include four capacitors: a capacitor C1, a capacitor C2, a capacitor C3 and a capacitor C4. In some embodiments, capacitor C2 is omitted (e.g., a no-connect capacitor) and, in some embodiments, capacitors C1, C3 and C4 are chip capacitors (e.g., ceramic chip capacitors). In other words, in some embodiments, the RC oscillator circuit includes only three capacitors. Embodiments of the invention that have RC oscillator circuits which include four capacitors may have higher precision (e.g., the fourth capacitor may provide more precise control of the frequency of the RC oscillator circuit), and the fourth capacitor may also increase the manufacturing cost of the device. In some aspects, capacitors C1, C3 and C4 may be X7R or X5R 0.5 pF chip capacitors. In some embodiments, the first copper wire 2 and the second copper wire 3 have a thickness that is within the range of about 30 µm to about 40 µm (equivalently a weight within the range of about 0.5 oz to about 1.5 oz).

Figure 7:
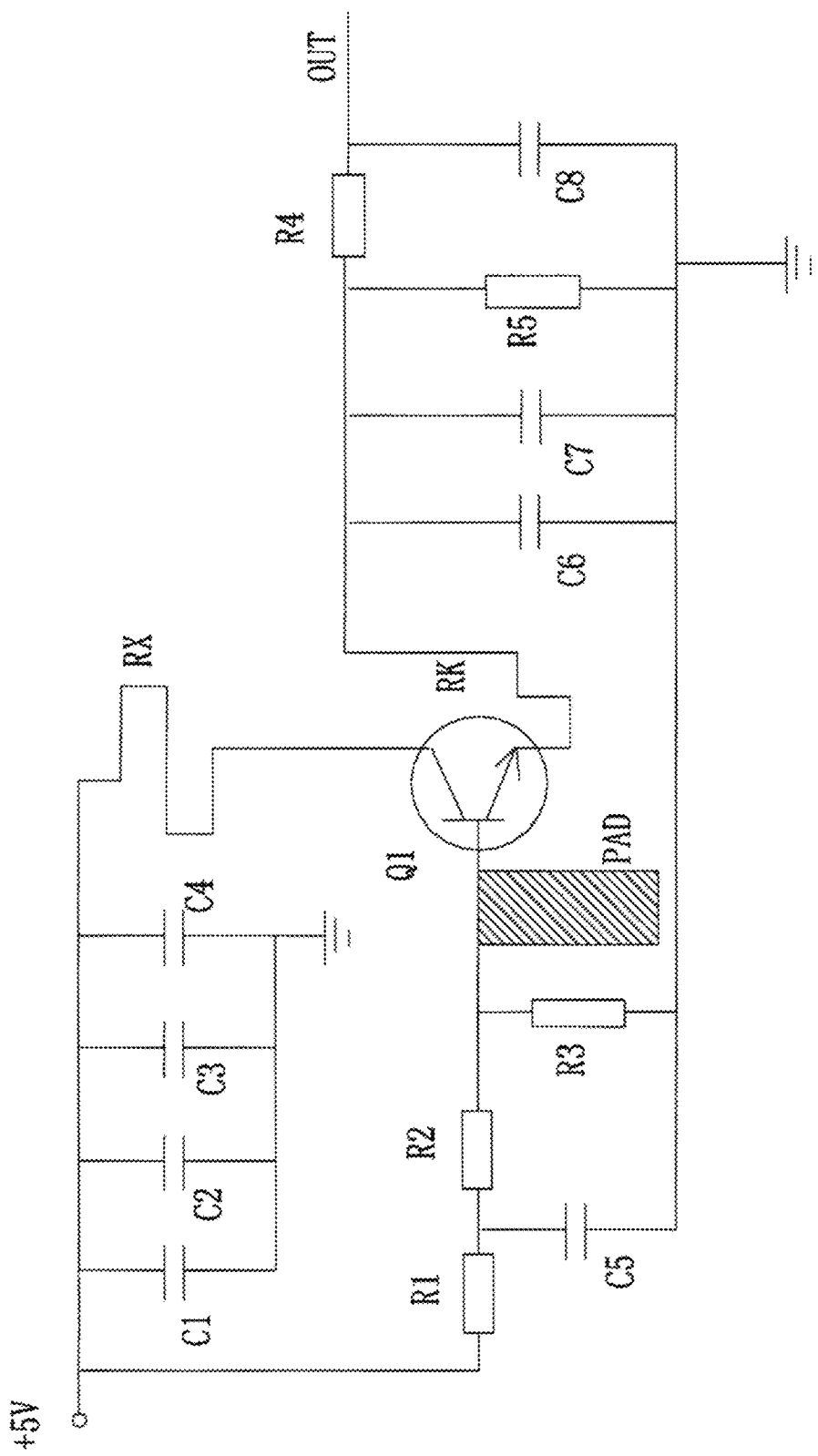
FIG. 7 is a circuit diagram of the radar transmitting and receiving sensor board according to one embodiment of the present invention.
Figure 8:
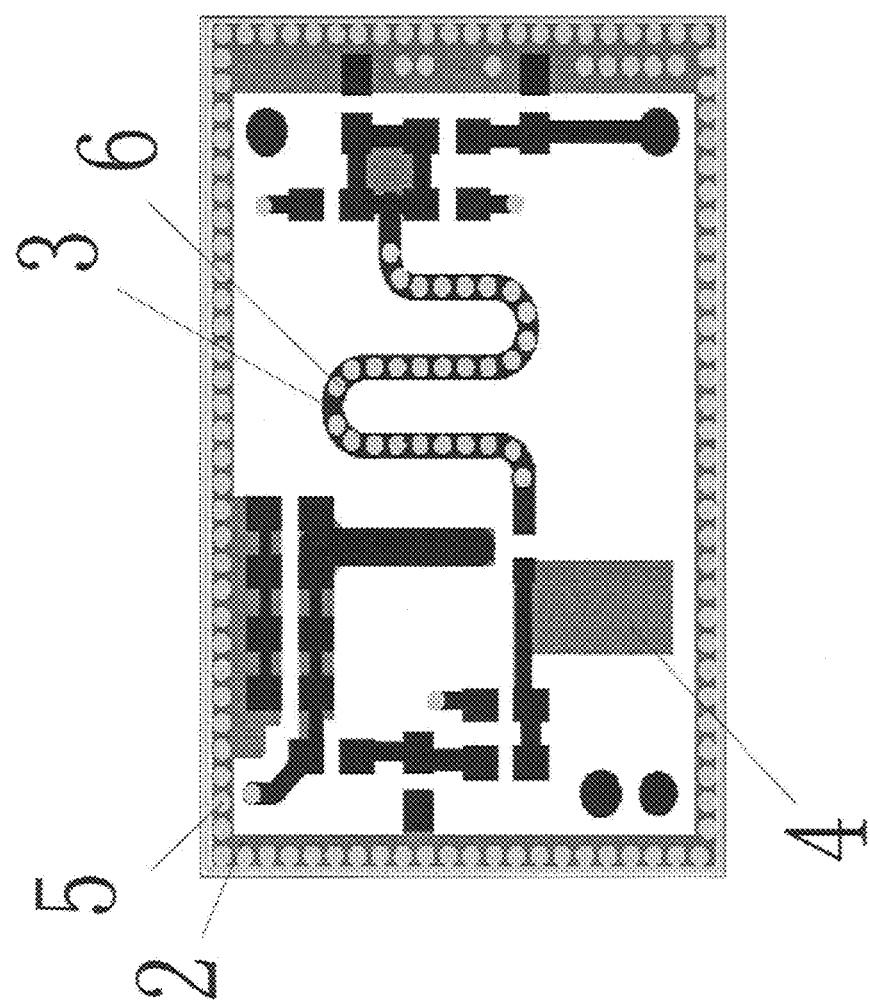
FIG. 8 is a wiring plan view of the radar transmitting and receiving sensor board circuit according to one embodiment of the present invention.
Figure 9:
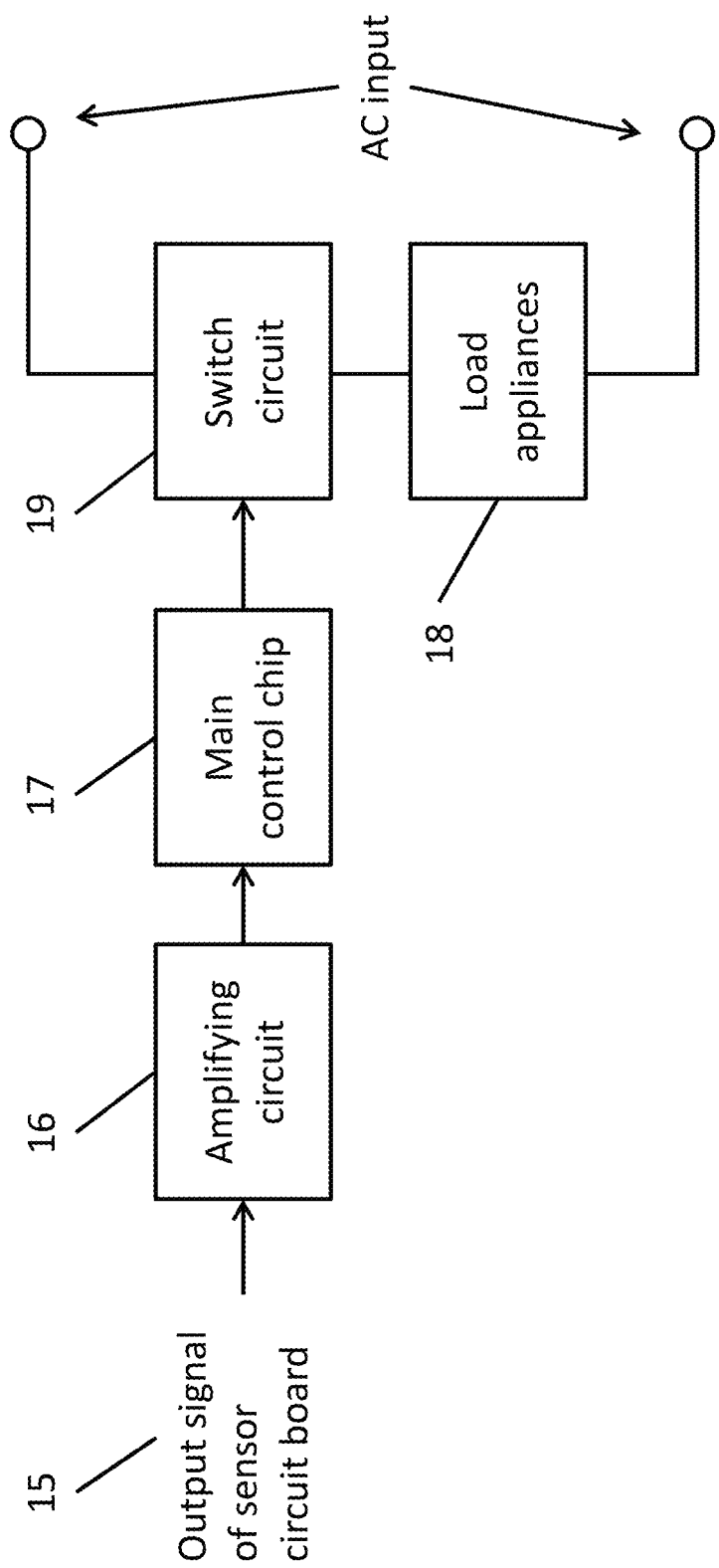
FIG. 9 is a circuit block diagram of a main control board according to one embodiment of the present invention.

In some aspects, RC filter circuits may be adopted for the first filter circuit 13 (or the input filter circuit) and the second filter circuit (or output filter circuit) 14. As shown in FIG. 7, the first filter circuit 13 may include a first resistor R1, a second resistor R2, a third resistor R3 and a fifth capacitor C5. Accordingly, the second filter circuit 14 may include a sixth capacitor C6, a seventh capacitor C7, an eighth capacitor C8, a fourth resistor R4, and a fifth resistor R5. The RC oscillator may include a number of capacitors: a first capacitor C1, a second capacitor C2, a third capacitor C3, a fourth capacitor C4, and a transmitting antenna RX. The collector of the transistor Q1 may be connected to the anti-coupling copper foil 4 (labeled "PAD" in FIG. 8). Accordingly, the emitter of the transistor Q1 is connected to the receiving antenna RK and the other end of the receiving antenna RK is connected to the output filter circuit.

According to some embodiments, during operation, a high-frequency microwave signal in the range of 5.8 GHz is transmitted by the microwave oscillator of the non-conductive substrate 1 through its integrated transmitting antenna 9, which is the combination of the first copper wire 2 and the first copper pillars 5. The receiving antenna 10, a combination of the second copper wire 3 and the second copper pillars 6, receives the signal reflected back. During receiving, the transmitted microwave signals are reflected back as frequency-shifted signals due to movement of humans, cars and other large objects. Through frequency mixing and wave detection and other operations applied to the signals, the signals 15 are output to the signal amplifying circuit 16 on the main control board and then are sent to the integrated circuit or main control chip 17 of the main control board for analysis. The main control board sends control signals to operate the switch circuit 19, which is in connection with the load appliances 18.

In some embodiments, the transmitting antenna at the edge or edges of the non-conductive substrate 1 is configured with a longer length to increase the transmitting signal strength. Accordingly, the receiving antenna is configured with a longer length to increase the receiving sensitivity and broaden the radar coverage. In some embodiments, the transmitting antenna and the receiving antenna at the edge of the sensor non-conductive substrate 1 may include first copper wire 2 having first copper pillar 5 protruding therefrom, and second copper wire 3 having second copper pillar 6 protruding therefrom to enhance the strength of the transmitting and receiving signals.

Some embodiments makes use of discrete components as the microwave oscillating circuit of the non-conductive substrate 1, the size of the non-conductive substrate 1, the width of the copper wire, the length of the receiving antenna, the density of recesses, the size of the counter-coupling copper foil and the component parameters and other details are respectably selected, which leads to a greatly enhanced anti-interference ability and a high sensitivity.

Finally, it should be noted that the forgoing embodiments is merely intended for describing the technical solution of embodiments, of the present invention, but embodiments of the present invention are not limited thereto. Although aspects of embodiments of the present invention are described in detail with reference to the forgoing example embodiments, it should be understood by those of ordinary skill in the art that the technical solution described within reference to the foregoing example embodiments may be modified or equivalent replacements may be made to some of the technical features therein. It will also be apparent to the skilled artisan that the embodiments described above are specific examples of a single broader invention that may have greater scope than any of the singular descriptions without departing from the spirit and scope of the present invention.

What is claimed is:

1. A sensor board for transmitting and receiving directional radar signals comprising:
    a non-conductive substrate having a plurality of first recesses distributed at intervals along at least one edge of the non-conductive substrate;
    a microwave oscillator comprising:
        an RC oscillator circuit comprising a plurality of capacitors connected in parallel between ground and an input power Vcc; and
        a transistor Q1;
    an anti-coupling foil arranged on the non-conductive substrate, wherein one end of the anti-coupling foil is connected to the base of the transistor Q1, and the other end of the anti-coupling foil is floating;
    a first filter circuit configured to filter input power Vcc;
    a second filter circuit configured to filter an output signal;
    a receiving antenna; and
    a transmitting antenna comprising:
        a first wire laid over the plurality of first recesses along the edge of the non-conductive substrate; and
        a plurality of first electrically conductive protrusions embedded in the first recesses, the first wire electrically connecting the first electrically conductive protrusions,
    wherein the transmitting antenna is connected to the collector of the transistor Q1, the input power Vcc is connected to the base of the transistor Q1 through the first filter circuit, the emitter of the transistor Q1 is connected to a first end of the receiving antenna, the second filter circuit is connected to a second end of the receiving antenna and is configured to output signals, and
    wherein the distance between two adjacent first electrically conductive protrusions is less than or equal to 1.5 mm; the total length of the first wire is greater than 80 mm.

2. The sensor board of claim 1, wherein the first wire laid along the edge of the non-conductive substrate is configured to form a framed-shaped closed loop.

3. The sensor board of claim 1, wherein the non-conductive substrate has a plurality of second recesses, and
    wherein the receiving antenna comprises a second wire laid over the plurality of second recesses, the second recesses being distributed at intervals along the second wire.

4. The sensor board of claim 3, wherein the second recesses are in a central portion of the non-conductive substrate,
    wherein the first wire forms a frame-shaped a closed loop, and
    wherein the second wire is surrounded by the first wire.

5. The sensor board of claim 3 further comprising a plurality of second electrically conductive protrusions,
    wherein the plurality of second electrically conductive protrusions are embedded in the second recesses, and the second wire electrically connects a plurality of the second electrically conductive protrusions to form the receiving antenna, and
    wherein the distance between two adjacent second electrically conductive protrusions is less than or equal to 1.5 mm, and the total length of the receiving antenna is greater than 20 mm.

6. The sensor board of claim 3, wherein the second wire has an S-shape.

7. The sensor board of claim 1, wherein the anti-coupling foil has a rectangular shape with a length more than 6.5 mm, a width more than 2.5 mm, and an aspect ratio in the range of 1.5:1 to 3:1.

8. The sensor board of claim 1, wherein the plurality of capacitors of the RC oscillator circuit comprises three chip capacitors.

9. The sensor board of claim 8 wherein the chip capacitors are X7R or X5R 0.5 pF chip capacitors.

10. The sensor board of claim 8, wherein the plurality of capacitors of the RC oscillator circuit comprises four chip capacitors.

11. The sensor board of claim 10 wherein the chip capacitors are X7R or X5R 0.5 pF chip capacitors.

12. The sensor board of claim 1 wherein the thickness of the first wire is in the range of 30 µm to 40 µm.

13. The sensor board of claim 1, wherein the first filter circuit and the second filter circuit are RC filter circuits.

* * * * *